(12) United States Patent
Kela et al.

(10) Patent No.: US 9,374,200 B2
(45) Date of Patent: Jun. 21, 2016

(54) TTI BUNDLING AND COLLISION AVOIDANCE

(71) Applicant: Broadcom Corporation, Irvine, CA (US)

(72) Inventors: Kalle Petteri Kela, Kaarina (FI); Lauri Johannes Eerolainen, Paimio (FI)

(73) Assignee: BROADCOM CORPORATION, Irvine, CA (US)

( * ) Notice: Subject to any disclaimer, the term of this patent is extended or adjusted under 35 U.S.C. 154(b) by 225 days.

(21) Appl. No.: 14/051,666

(22) Filed: Oct. 11, 2013

(65) Prior Publication Data

US 2015/0103749 A1    Apr. 16, 2015

(51) Int. Cl.
*H04L 1/18* (2006.01)
*H04W 72/04* (2009.01)
*H04L 5/00* (2006.01)

(52) U.S. Cl.
CPC ............ *H04L 1/1822* (2013.01); *H04L 1/1835* (2013.01); *H04L 1/1877* (2013.01); *H04L 5/0055* (2013.01); *H04W 72/0446* (2013.01)

(58) Field of Classification Search
None
See application file for complete search history.

(56) References Cited

U.S. PATENT DOCUMENTS

2009/0300457 A1* 12/2009 Kuo .............................. 714/749
2010/0098010 A1* 4/2010 Kuo .............................. 370/329
2011/0010598 A1* 1/2011 Wang et al. .................. 714/748
2013/0083708 A1* 4/2013 Lin ........................... H04L 5/14
                                                                 370/280
2015/0098371 A1* 4/2015 Vajapeyam et al. ........... 370/280

OTHER PUBLICATIONS

3GPP TS 36.321; V9.0.0; Release 9; LTE; Evolved Universal Terrestrial Radio Access (E-UTRA); Medium Access Control (MAC) protocol specification, Oct. 2009; 49 pages.
3GPP TS 36.213 V8.2.0; Release 8; $3^{rd}$ Generation Partnership Project; Technical Specification Group Radio Access Network; Evolved Universal Terrestrial Radio Access (E-UTRA); Physical layer procedures, Mar. 2008; 30 pages.

* cited by examiner

Primary Examiner — Hoon J Chung
(74) Attorney, Agent, or Firm — Oblon, McClelland, Maier & Neustadt, L.L.P.

(57) ABSTRACT

A radio device/user equipment determines that a later received grant of bundled uplink resources collides with an earlier received grant of bundled uplink resources. The earlier received grant has associated with it an active re-transmission process. In response to that collision determination, at least a re-transmission (HARQ) buffer associated with the earlier received grant is flushed. In one embodiment all HARQ buffers are flushed; in another the HARQ buffer associated with the earlier received grant is flushed while the one associated with the later received grant is not. Several ways are described to determine whether there is a collision: whether the later received grant aligns with a boundary of the resources granted by the earlier received grant, and whether there is an actual collision among the different HARQ processes. Calculating HARQ process numbers is also described where an offset is used to account for the grants allocating bundled TTIs.

17 Claims, 6 Drawing Sheets

| UL/DL configuration | nbr_ul_sf | nbr_processes | ul_sf_indx value range |
|---|---|---|---|
| FDD n/a | 10 | 4 | [0..9] |
| TDD 1 | 4 | 2 | [0..3] |
| TDD 6 | 5 | 3 | [0..4] |

TTI BUNDLING AND COLLISION AVOIDANCE

TECHNICAL FIELD

The present invention relates to operations in wireless communications and more specifically describes a method, apparatus and computer program for dealing with collisions resulting from different grants of bundled uplink radio resources to the same user equipment (UE), such as may arise where the UE has an ongoing first hybrid automatic repeat request (HARQ) process associated with a previously granted first transmission time interval (TTI) bundle while the UE is granted a subsequent transmission time interval (TTI) bundle having an associated second HARQ process.

BACKGROUND

Research into improving cellular wireless communications have traditionally focused on improving capacity and coverage. One technique to improve capacity is for a user equipment (UE) to send a single transport block repeatedly in multiple consecutive subframes. When the network schedules these multiple consecutive subframes with a single resource grant to the UE, this reduces control signaling overhead because there is only one set of signaling messages for the whole transmission. In the evolved Universal Mobile Telecommunication System (UMTS) Terrestrial Radio Access (E-UTRA, also referred to as Long Term Evolution or LTE) radio access technology, this transport block is sent from the Medium Access Control (MAC) layer and the scheduling technique is known as transmission time interval (TTI) bundling. TTI bundling is a particularly efficient technique to improve coverage at the cell edge for voice-over Internet Protocol (VoIP) communications. In the LTE system the TTI is normally 1 ms, and the uplink allows groups of four TTIs to be bundled as mentioned above.

But the 3GPP specifications (for example, series TS 36.321 and 36.213) do not address how the UE should handle colliding TTI bundles. The network access node, known in LTE as an eNB, can send UL grants to the UE which are colliding with TTI bundling that the UE has already initiated. These colliding TTI bundles also impact the synchronous uplink Hybrid Automatic Repeat Request (HARQ) signaling. Services such as VoIP that involve a semi-static packet rate may be scheduled by the eNB via semi-persistent scheduling so as to reduce the control signaling overhead even more. But if the uplink semi-persistent scheduling interval is not evenly divisible by the TTI bundle size, then this also undermines the synchronous uplink HARQ.

SUMMARY

According to a first aspect of these teachings, there is provided a method of operating a radio device. In this aspect the method comprises: determining that a later received grant of bundled uplink resources collides with an earlier received grant of bundled uplink resources with which is associated an active re-transmission process; and in response flushing at least a re-transmission buffer associated with the earlier received grant.

According to a second aspect of these teachings, there is provided an apparatus for operating a radio device. In this aspect the apparatus comprises a processing system having at least one processor and at least one memory storing computer program code. This processing system is configured to cause the apparatus at least to: determine that a later received grant of bundled uplink resources collides with an earlier received grant of bundled uplink resources with which is associated an active re-transmission process; and in response flush at least a re-transmission buffer associated with the earlier received grant.

According to a third aspect of these teachings, there is provided a computer readable memory tangibly storing a computer program comprising a set of computer instructions for operating a radio device. In this aspect the set of computer instructions comprises:
  code for determining that a later received grant of bundled uplink resources collides with an earlier received grant of bundled uplink resources with which is associated an active re-transmission process; and
  code responsive to the determining for flushing at least a re-transmission buffer associated with the earlier received grant Further features and advantages of the invention will become apparent from the following description of preferred embodiments of the invention, given by way of example only, which is made with reference to the accompanying drawings.

DETAILED DESCRIPTION

The examples detailed herein are in the context of the E-UTRA system (including LTE-Advanced and other future improvements of E-UTRA), but the broader teachings herein are not limited only to that particular radio access network technology and can be readily adapted to other radio access technologies in which the radio network can schedule a UE for uplink transmissions on bundled radio resources, and which also uses HARQ for data re-transmissions.

As an overview of the more detailed teachings below, the UE's MAC layer could recover from a TTI bundle collision by calculating the colliding uplink HARQ process, re-calculating a bundling start offset, and continuing with new bundle boundaries that are defined using that offset.

Figure 1:
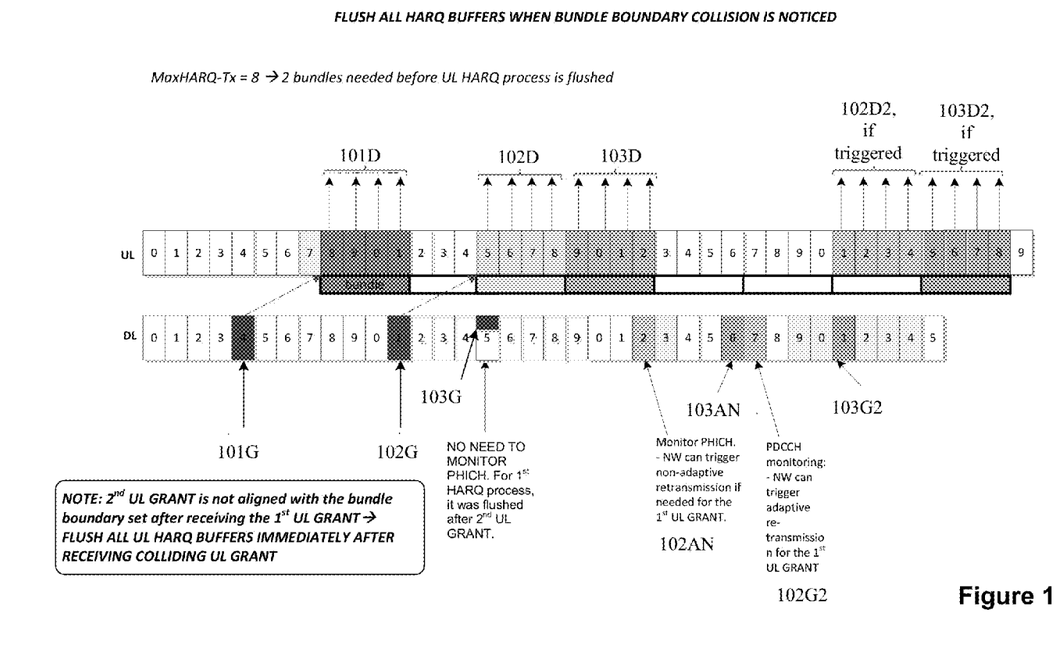
FIG. 1 is a chronological signaling diagram for uplink and downlink subframes showing three uplink resource grants received by a UE, associated uplink data transmissions by the UE, and other signaling according to a first embodiment of these teachings.
Figure 2:
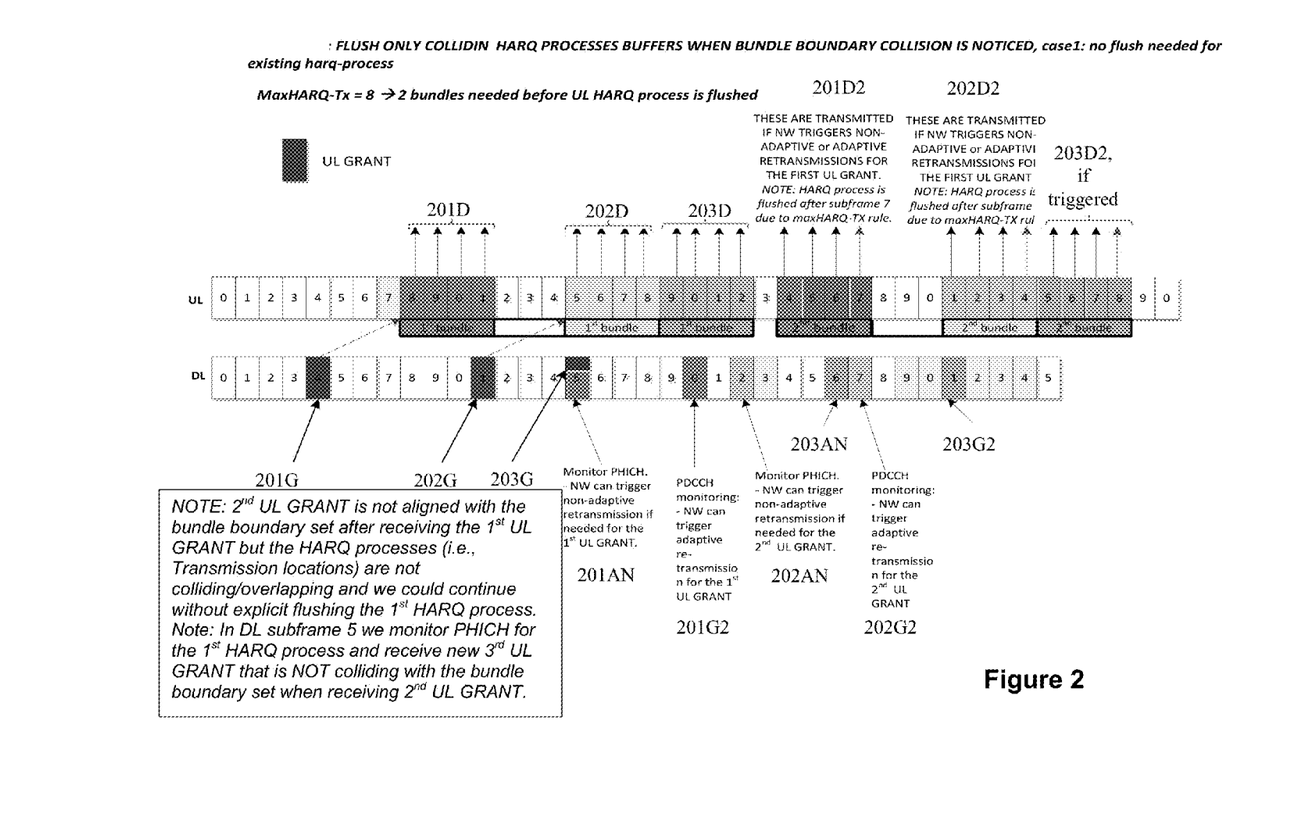
FIG. 2 is a chronological signaling diagram similar to FIG. 1 but showing signalling according to a second embodiment of these teachings.
Figure 3:
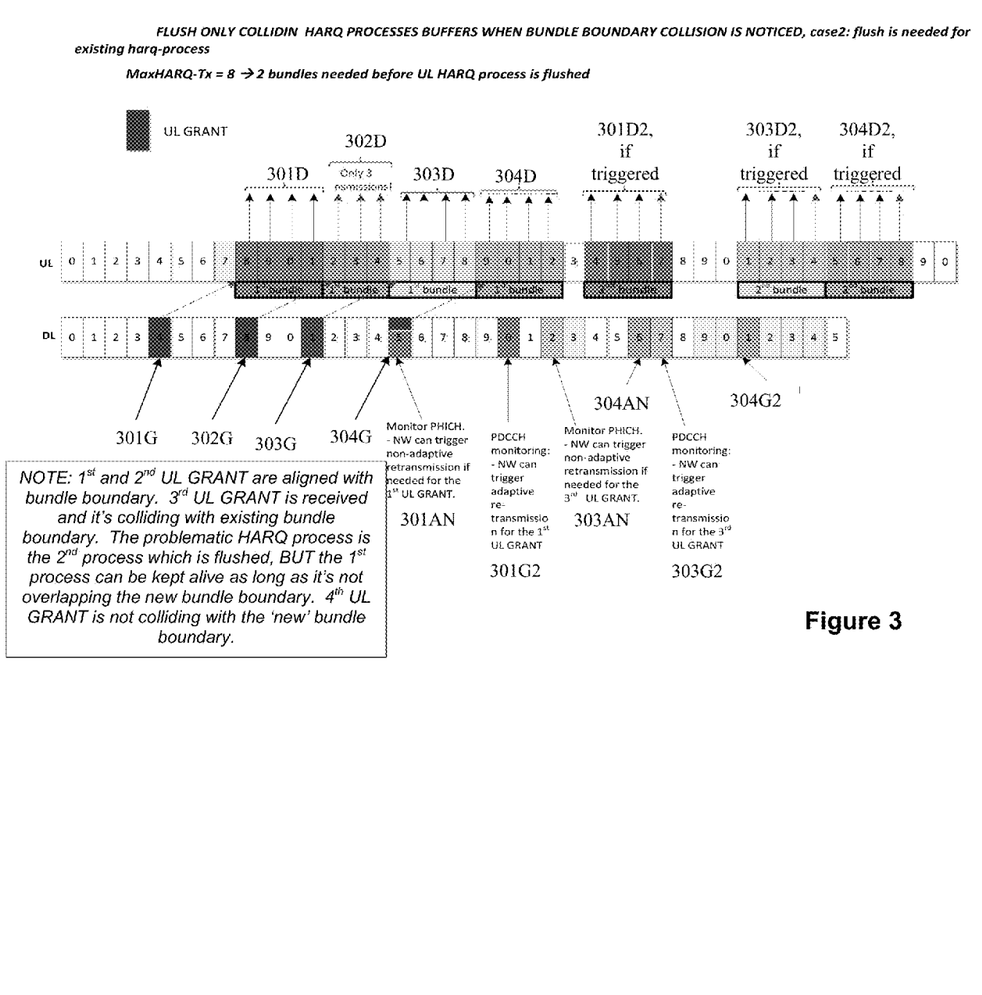
FIG. 3 is a chronological signaling diagram similar to FIG. 2 but showing four uplink resource grants, associated data transmissions and other signaling according to the second embodiment of these teachings.

Below are described two different approaches for solving the above mentioned collision issue. When TTI bundling is enabled and a UE gets a new colliding uplink grant (or when a colliding semi-persistently scheduled (SPS) uplink grant recurs which is equivalent since also the SPSs arise from uplink grants), in a first embodiment when a TTI bundle collision happens the UE could flush all uplink HARQ buffers and start bundling as if the colliding resource allocation was the first allocation the UE received after it was enabled for TTI bundling. FIG. 1 shows a non-limiting example of this first embodiment. In a second embodiment the UE could calculate the colliding uplink HARQ process, recalculate the bundling start offset, and continue with new bundle boundaries defined by the offset. FIGS. 2-3 present non-limiting examples of this second embodiment.

First are detailed clearing of the HARQ buffers, after which are described offsetting the TTI bundle boundaries. FIGS. 1-3 each illustrate a sequential series of uplink (UL) subframes and downlink (DL) subframes. Suffixes on the reference numbers are as follows: G represents a grant of radio resources sent by the network access node to the UE (in E-UTRA this is sent on the physical downlink control channel PDCCH); D represents data being sent as an original transmission (as opposed to re-transmitted data); AN represents the acknowledgment (ACK) or negative acknowledgment (NACK) which the network access node sends to the UE confirming receipt or non-receipt of the UE's transmitted data (in E-UTRA this is sent on the physical HARQ indicator channel PHICH); G2 represents a new grant to the UE for re-transmitting data (also on the PDCCH); and D2 represents a first re-transmission of data by the UE.

In cellular systems that use a HARQ protocol, re-transmitted data is sent from the UE's HARQ buffer associated with a given original data transmission, so once that HARQ buffer is flushed re-transmissions are not possible. In many cellular systems such as E-UTRAN, the UE maintains a separate HARQ buffer for each distinct original data transmission, and in the examples below there is one HARQ buffer associated with each distinct TTI bundle that the UE is granted by a single PDCCH, and typically the buffer is cleared at the earliest of the original or re-transmitted data being acknowledged by the recipient, and when the maximum number of re-transmissions is reached. In systems where the UE can have multiple simultaneous HARQ buffers, typically each original transmission and its associated HARQ buffer is associated with a HARQ process number. "Flushing" a HARQ buffer is a term of art in the cellular field meaning to clear or otherwise delete all data that is temporarily stored in the memory spaces of that HARQ buffer. Uplink HARQ buffers are within the UE since the underlying data is to be sent uplink, but the network access node also has downlink HARQ buffers for temporarily storing data it sends downlink to one or more UEs in case some re-transmission is needed.

FIG. 1 is a chronological signaling diagram for uplink and downlink subframes showing three uplink resource grants 101G, 102G, 103G that the UE receives from the network (from the eNB in an E-UTRA network), associated data transmissions 101D, 102D, 103D by the UE on those granted resources, and various other related signalling. In the first embodiment of these teachings, once the UE determines that a later received grant of bundled uplink resources collides with an earlier received grant of bundled uplink resources, the UE in response flushes all of its HARQ buffers that are associated with grants of uplink resources.

The UE may have other downlink HARQ buffers, but these are not associated with any grant of uplink resources and so they are unaffected by the UE's collision determination.

Other uplink HARQ buffers that were associated with an uplink grant in which either a) the sent uplink data has been acknowledged, or b) the sent uplink data has been re-transmitted the maximum number of times, are no longer associated with that former uplink grant and so those also are unaffected by the UE's collision determination. In E-UTRA systems the maximum number of data re-transmissions is set by the network using a parameter named MaxHARQTX.

The description of FIG. 1 herein, and also of FIGS. 2-3, is from the perspective of the UE. The network access node also performs companion procedures so it understands what will be the UE's behavior, even without explicit control signalling between them so long as both the network and the UE follow the same rules. In this case the network access node will also identify when there is a collision, will recognize that the UE has flushed or will flush its buffer as described herein, and will know that re-transmissions of the flushed data are not possible. Knowing this, the network cannot merely send a negative acknowledgment if it does not receive the original data but must re-schedule new uplink resources on which the UE can send the data that the network never correctly received. For each of FIGS. 1-3 unless indicated otherwise due to buffer flushing, all HARQ processes are assumed active and so each UL grant has an associated active HARQ process and data in its associated HARQ buffer.

Returning now to FIG. 1, the first UL grant 101G grants a bundle of radio resources consisting of four TTIs 101D in which the UE sends original first data. The second UL grant 102G grants another bundle of radio resources, also consisting of four TTIs 102D in which the UE sends original second data, but the second UL grant 102G is not aligned with the boundary of the first TTI bundle 101D and so the UE recognizes this as a collision. Then according to the first embodiment the UE, at the time it recognizes this impending collision (immediately after receiving the colliding second UL grant 102G), flushes all of its HARQ buffers. The PHICH in which the UE would normally receive the network's ACK/NACK for the first data in TTI bundle 101D is in subframe 5, the same one in which the UE receives a third UL grant 103G. But since all HARQ buffers are cleared by that time there is no need for the UE to monitor that PHICH. Further, if there were any ongoing HARQ processes (meaning there is data stored in the associated HARQ buffer) arising from an UL grant prior to the first UL grant 101G shown in FIG. 1, those HARQ buffers would also be flushed at the same time.

Further in FIG. 1, the third UL grant 103G is aligned with the leading boundary of the second TTI bundle 102D and so the UE recognizes this as not being a collision and does not flush its HARQ buffers. The HARQ buffer associated with the second UL grant 102G has data transmitted in the second bundle of TTIs 102D since that HARQ buffer was filled after the HARQ buffers were flushed. Thus if the network sends a NACK in the PHICH 102AN associated with the second bundle of TTIs 102D the UE will have HARQ buffered data to re-transmit, which it does at TTI bundle 102D2 if in fact the UE receives a NACK in subframe 102AN (or more precisely, if the UE does not receive an ACK there).

The procedure for re-transmissions of the third data sent originally in the third TTI bundle 103D granted by the third UL grant 103G is similar and also conventional since also the HARQ buffer for that third data has not been flushed; if the UE receives a NACK in the PHICH 103AN mapped from the third TTI bundle 103D, it will send the data in that HARQ buffer in TTI bundle 103D2 as a re-transmission of that third data.

In the event that the network was not able to properly receive the first data in the first TTI bundle 101D, normal HARQ is not available because that HARQ buffer has been flushed. In that case there are several options for the network to get that first data again. In one option the network can trigger non-adaptive re-transmission of the first data, such as by triggering this re-transmission in the PHICH 102AN that maps from the second TTI bundle 102D. This is convenient because the network knows the UE will be monitoring that PHICH 102AN. The UL resources for this re-transmission would map specifically from the PHICH 102AN. Another option is for the network to send a new PDCCH 102G2 to trigger the UE to re-send its first data. In this case the re-transmission would be adaptive and the network can use the PDCCH 101G2 to schedule any available UL resources for the re-transmission rather than those resources being tied by a firm mapping rule as with the PHICH triggering. Non-adaptive re-transmission use the transmission parameters that were decided at the time of the original data transmission, while adaptive re-transmissions can be adapted via the network's PDCCH for changes to the channel conditions. In both cases the re-transmission by the UE of the first data would be a re-send of the original first data, since due to the earlier HARQ buffer flushing the UE has no HARQ buffered first data to re-transmit according to conventional HARQ practices. The first data is not re-sent in FIG. 1 because, as illustrated, the network received it properly on the original transmission in the first TTI bundle 101D.

One scenario implementing the second embodiment is shown at FIG. 2, which similar to FIG. 1 has three UL grants 201G, 202G and 203G that respectively grant a first TTI bundle 201D, a second TTI bundle 202D and a third TTI bundle 203D. Like FIG. 1 the second UL grant 202G in FIG. 2 is not aligned with the leading boundary of the first TTI bundle 201 while the third UL grant 203G in FIG. 2 is aligned with the boundary of the second TTI bundle 203D. From these alignments the UE determines that the second UL grant 202G is colliding and the third UL grant 203G is not.

In the second embodiment shown at FIG. 2, when the UE determines such a collision it flushes its HARQ buffer associated with the earlier received first grant 201G. But in the FIG. 2 implementation that flushing is further conditional on the first HARQ process associated with the earlier received first grant 201G (and therefore associated with the first data sent originally on the first TTI bundle 201D) colliding with a second HARQ process associated with the later received second grant 202G. In FIG. 2 that further condition is not met and so the UE determining that the later received second UL grant 202G collides will result in the flushing of no HARQ buffers at all.

From the first two UL grants 201G, 202G the UE can know where the re-transmission resources lie for the two HARQ processes associated with those grants 201G, 202G (associated through the granted TTI bundles 201D and 202D) and so those two HARQ processes are not in fact colliding, despite that the later received second grant 202G is not aligned with the boundary of the first TTI bundle 201D.

Now consider the normal HARQ re-transmissions shown at FIG. 2. Since no HARQ buffers are flushed the further condition (actually colliding HARQ processes) is not met and so all the HARQ re-transmissions can proceed as is conventional for E-UTRA rules for the three UL grants illustrated.

Non-adaptive re-transmission for the first data that was originally sent in the first TTI bundle 201D is triggered in PHICH 201AN, and the first re-transmission of that first data is sent in TTI bundle 201D2 using data in the HARQ buffer associated with the first UL grant 201G and the first TTI bundle 201D. Alternatively, the network can trigger adaptive re-transmission of the first data using a PDCCH, such as 201G2.

Non-adaptive re-transmission for the second data that was originally sent in the second TTI bundle 202D is triggered in PHICH 202AN, and the first re-transmission of that second data is sent in TTI bundle 202D2 using data in the HARQ buffer associated with the second UL grant 202G and the second TTI bundle 202D. Alternatively, the network can trigger adaptive re-transmission of the second data using a PDCCH, such as 202G2.

Non-adaptive re-transmission of the third data follows this same protocol. PHICH 203AN triggers this for the third data that was originally sent in the third TTI bundle 203D, and the first re-transmission of that third data is sent in TTI bundle 203D2 using data in the HARQ buffer associated with the third UL grant 203G and the third TTI bundle 203D. As with the other HARQ processes in FIG. 2, the network can alternatively trigger adaptive re-transmission of the third data using a PDCCH such as 203G2.

FIG. 3 illustrates a different scenario implementing the second embodiment. FIG. 3 shows four UL grants 301G, 302G, 303G and 304G that respectively grant a first TTI bundle 301D, a second TTI bundle 302D, a third TTI bundle 303D and a fourth TTI bundle 304D. In this case the second UL grant 302G is aligned with the leading boundary of the first TTI bundle 301, the third UL grant 303G is not aligned with the boundary of the first TTI bundle 301D (or any other bundle), and the fourth UL grant 304G is aligned with a TTI boundary (of TTI bundle 303D). From these alignments the UE determines that the third UL grant 303G is the only one colliding.

As to determining the collision, the second and third TTI bundle and grants of FIG. 3 are analogous to the first and second TTI bundles and grants of FIG. 2; namely for FIG. 3 the later received third grant 303G of bundled uplink resources 303D collides with the earlier received second grant 302G of bundled uplink resources 302D. Like FIG. 2 the HARQ process associated with that earlier received grant is the one of concern, but unlike FIG. 2 in the FIG. 3 scenario there is an actual conflict in these two HARQ processes and so the HARQ buffer associated with the earlier received grant and resources (302G and 303D in FIG. 3) is flushed at the time 303G the UE makes the collision determination.

In the FIG. 3 example, the decision to flush the HARQ buffer is made at 303G and at that time there are two ongoing HARQ processes, and thus two HARQ buffers with data: one associated with the first grant 301G and TTI bundle 301D, and another associated with the second grant 302G and TTI bundle 302D. In the second embodiment there is a collision determined between an earlier received UL grant (302G in FIG. 3) and a later received UL grant (303G in FIG. 3), and of those only the HARQ buffer associated with the earlier received UL grant 302G of the colliding grants needs to be flushed. That means the HARQ buffer associated with the first grant 301G and TTI bundle 301D is not flushed in FIG. 3. No collision is detected after the third grant 303G so the HARQ buffer associated with the fourth grant 304G and TTI bundle 304D is also not flushed in FIG. 3.

In FIG. 3 the network NACKs the original transmissions of the first data in TTI bundle 301D, of the third data in TTI bundle 303D and of the fourth data in TTI bundle 304D, in the respective PHICHs 301AN, 303An and 304AN. The first re-transmission of those data blocks then occurs in the TTI bundles that map from those PHICHs, respectively in TTI bundle 301D2, 303D2 and 304D2. The network can alternatively use adaptive re-transmission for those data blocks by scheduling resources via a PDCCH, such as shown at 301G2, 303G2 and 304G2.

For the second data sent originally in the second TTI bundle 302D, the associated HARQ buffer was flushed so non-adaptive re-transmission according to conventional protocol is not possible if the network NACKs the original transmission of the second data that was sent in TTI bundle 302D.

The UE and the network need to keep track of the UL HARQ process numbers so they will both know which HARQ buffers are flushed and which are not. This is more difficult for the second embodiment where some but not all buffers associated with an ongoing (active) UL HARQ process are flushed. The difficulty arises from the fact that when there is a collision between two UL grants, each grant allocates a bundle of TTIs rather than just one. This propagates through the PHICH mapping so the re-transmission resources are also a TTI bundle rather than a single subframe.

Subframes in the time division duplex (TDD) mode of E-UTRA are either UL or DL depending on the specific TDD configuration that is in effect for the given radio frame. There are a finite number of these TDD UL/DL configurations, indexed 0 through 7. For all of these except TDD UL/DL configuration 0 (due to varying unused UL subframes), and for all instances of the frequency division duplex (FDD) mode of E-UTRA, when TTI bundling is in operation the UL HARQ process number can be calculated as follows:

$$\text{offset} = (sfn \times nbr\_ul\_sf + ul\_sf\_indx) \text{ of the first bundled transmission}$$

$$\text{UL HARQ process } nbr = \left(\text{floor}\left(\frac{sfn \times nbr\_ul\_sf + ul\_sf\_indx - \text{offset}}{TTI\_BUNDLE\_SIZE}\right)\right)\text{Mod}(nbr\_processes)$$

Figure 4:
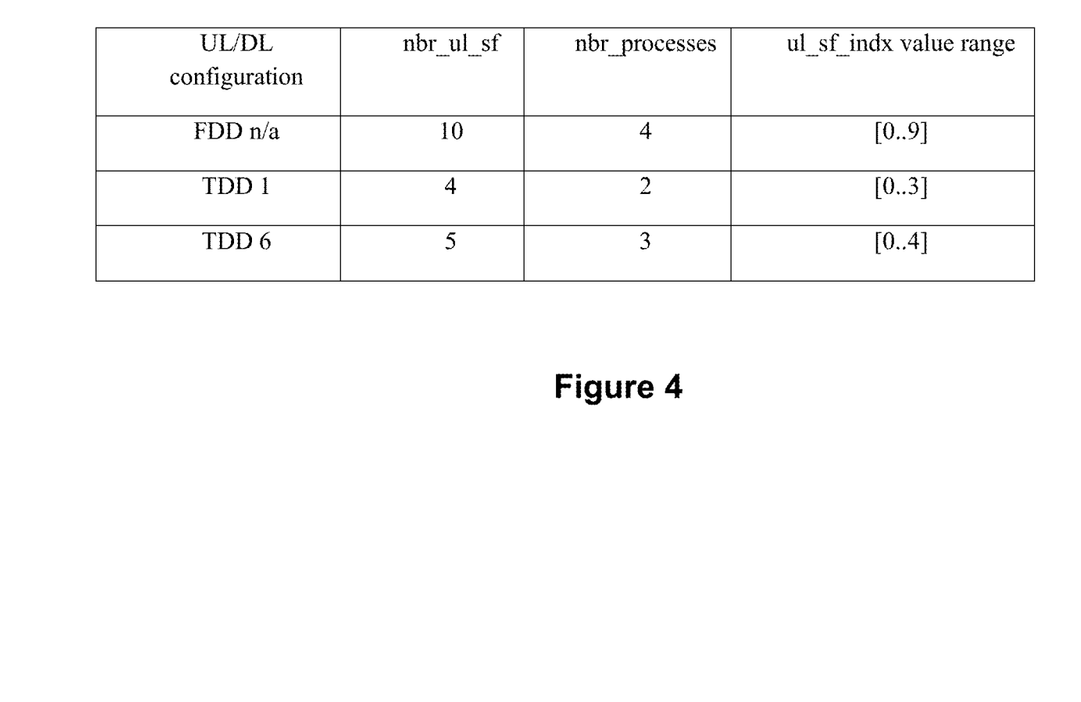
FIG. 4 is a table in which each row shows parameter values for calculating the HARQ process number when TTI bundling is in use (and assuming a constant TTI bundling size of 4), according to embodiments of these teachings.

In the above equations, sfn is the system frame number, nbr_ul_sf is the number of UL subframes in one radio frame (which depends on the UL/DL configuration), ul_sf_indx is the index of UL subframe in the corresponding radio frame, and nbr_processes is the number of UL HARQ processes. Assuming a constant TTI_BUNDLE_SIZE is 4, FIG. 4 is a table of possible values for the other parameters for calculating the HARQ process number when TTI bundling is in use.

As can be seen from the subframe indexing in FIGS. 1-3, the subframe numbering 'wraps around' when crossing radio frame boundaries. There is a similar wrap around issue when the system frame number (SFN) re-initiates to zero. This SFN wrap around issue can be handled to adjust the HARQ process numbers to continue seamlessly after the SFN wrap around. As one example, the equation below handles the SFN wrap-around for TDD UL/DL configuration 6:

$$\left(\frac{nbr\_ul\_sf \times 1024}{TTI\_BUNDLE\_SIZE}\right)\text{Mod}(nbr\_processes) = 2$$

In the equation above, nbr_processes is the number of ongoing HARQ processes. For TDD UL/DL configuration 6, the offset is adjusted for the SFN wrap around by adding 2 so the HARQ process numbers continue seamlessly. So for example when the SFN wraps around the offset can be adjusted as follows for TDD UL/DL configuration 6:

$$\text{offset}=(\text{offset}+2\times TTI\_BUNDLE\_SIZE)\text{Mod}(1024\times nbr\_ul\_sf)$$

If a TTI bundle collision occurs, the UE could recalculate the above described bundling offset and either flush all the UL HARQ buffers (per the first embodiment) or just the colliding UL HARQ buffer (per the second embodiment). The colliding HARQ buffer can be determined by using the above described UL HARQ process number equation. After that the UE can continue with the new bundle boundaries. The eNB is also synchronized with the new bundle boundaries because the eNB is the one that sends the UL grants that caused the collision.

The first embodiment above provides the technical effect of being quite simple to implement. The second embodiment above provides the technical effect of being more dynamic and also enabling conventional HARQ re-transmissions for all other HARQ processes except the one with the flushed buffer. Both embodiments enable all possible TTI bundling and UL semi-persistent scheduling configurations, and either can be implemented in LTE and LTE-Advanced radio technologies.

Figure 5:
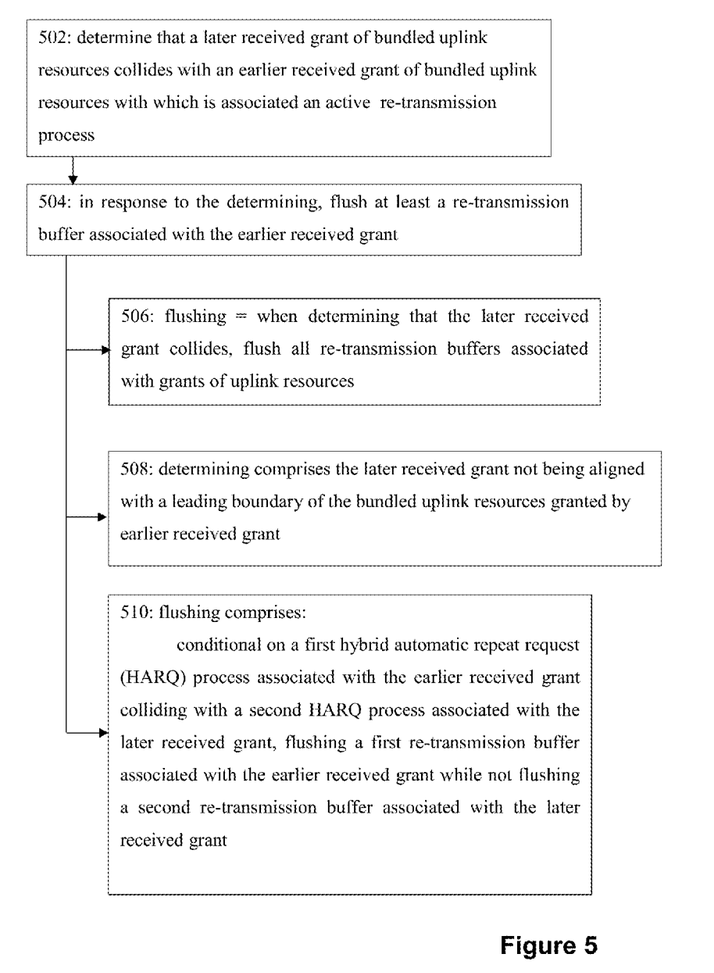
FIG. 5 is a logic flow diagram that illustrates from the perspective of a user equipment (UE) the operation of a method, operational steps performed by the UE or components thereof, and execution of computer instructions comprising code embodied on a computer-readable memory for controlling the UE, in accordance with certain embodiments of these teachings.

FIG. 5 presents a summary of certain of the above embodiments from the perspective of the UE 20, and may be considered to represent a method for operating a radio device such as for example a user equipment in an E-UTRA network, or steps taken by the UE 20 or by an apparatus that controls a radio device such as the UE 20 (such an apparatus may be the radio device's/UE's processing system), or the result of executing certain strings of computer code which can be installed and run in the radio device/UE 20. At block 502 the radio device/UE 20 determines that a later received grant of bundled uplink resources (a granted TTI bundle in FIGS. 1-3) collides with an earlier received grant of bundled uplink resources; and in response at block 504 the radio device/UE flushes at least a re-transmission buffer (HARQ buffer in FIGS. 1-3) associated with the earlier received grant.

Further specifics from the various non-limiting embodiments are summarized in the remainder of FIG. 5. For example, block 506 specifies for the first embodiment, where the flushing comprises flushing all re-transmission buffers that are associated with grants of uplink resources when determining that the later received grant collides.

Block 508 specifies for the second embodiment, where the determining first stated at block 502 comprises the later received grant not being aligned with a leading boundary of the bundled uplink resources granted by the earlier received grant. Block 510 further summarizes another implementation of the second embodiment that the flushing is conditional on a first hybrid automatic repeat request (HARQ) process associated with the earlier received grant colliding with a second HARQ process associated with the later received grant, and that the flushing comprises flushing a first re-transmission buffer associated with the earlier received grant while not flushing a second re-transmission buffer associated with the later received grant.

Also detailed above, non-adaptive re-transmission can be used as needed for data in the second re-transmission buffer that is not flushed. And finally there was described offsets for keeping track of the HARQ process number when TTI bundling is in use, which can be used for the determining that was first mentioned at block 502. In that latter instance, for each of the bundled uplink resources associated with the respective earlier received and later received grants, the radio device/UE calculates a HARQ process number using an offset that depends (at least) on a number of uplink subframes in a given radio frame and a size of the bundled uplink resources.

The embodiments of these teachings shown at FIG. 5 and summarized thereafter may be practiced by a radio device such as the UE for example, or by one or more components thereof. As non-limiting examples such components may include at least one processor and at least one computer readable memory tangibly storing executable software code, or a modem, or a USB dongle, or a chipset, or a universal system identity module (USIM), an antenna module, or even a radio frequency RF module (sometimes referred to as a RF front end). Some embodiments may be combinations of these components.

The logic diagram of FIG. 5 may be considered to illustrate the operation of a method, and a result of execution of a computer program stored in a computer-readable memory, and a specific manner in which components of an electronic radio device are configured to cause that electronic radio device to operate, whether such an electronic radio device is the UE or, reading FIG. 5 from the opposite perspective the radio device may be the radio access node/eNB which also determines that there is a collision but instead of flushing its HARQ buffers it tracks suspended HARQ processes at the UE which are the same processes corresponding to the UE's flushed HARQ buffers. The various blocks shown in FIG. 5 may also be considered as a plurality of coupled logic circuit elements constructed to carry out the associated function(s), or specific result of strings of computer program code or instructions stored in a memory.

Such blocks and the functions they represent are non-limiting examples, and may be practised in various components such as integrated circuit chips and modules, and the exemplary embodiments of this invention may be realised in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/UE, to perform the various functions summarized at FIG. 5 and detailed elsewhere herein, and (c) circuits, such as a microprocessor(s) or a portion of a microprocessor(s), that require software or firmware for operation, even if the software or firmware is not physically present. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or application specific integrated circuit for a user equipment UE or other type of radio device, or a similar integrated circuit in a radio network element that communicates via a radio access node with the radio device/UE.

Figure 6:
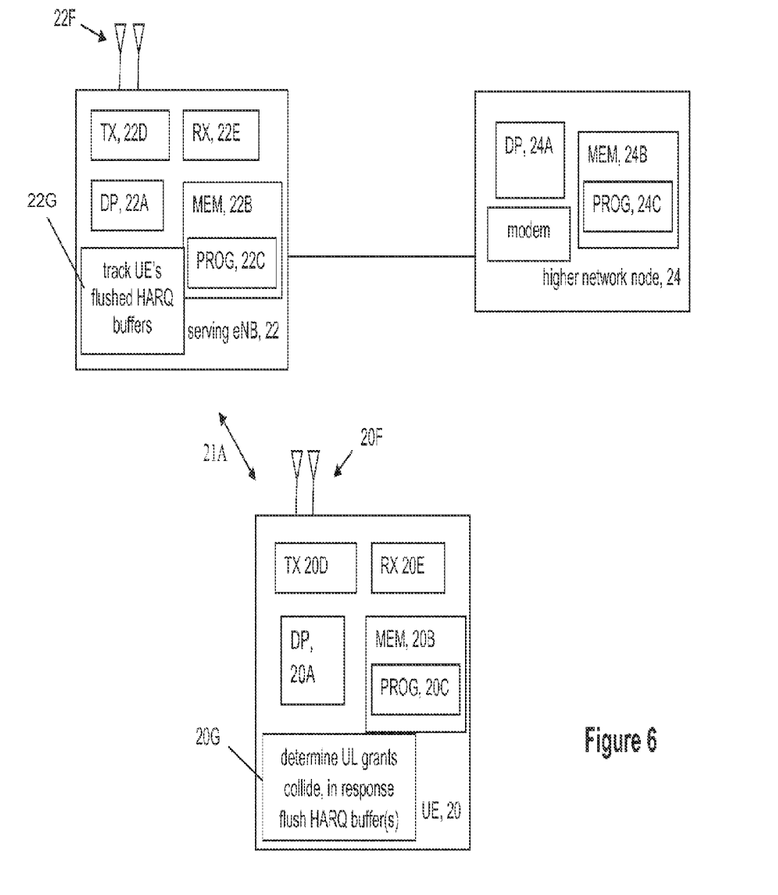
FIG. 6 is a simplified block diagram of a UE in communication with a radio network access node such as an eNB, and are exemplary electronic devices suitable for use in practicing the exemplary embodiments of these teachings.

Reference is now made to FIG. 6 for illustrating a simplified block diagram of various electronic devices and apparatus that are suitable for use in practising the exemplary embodiments of this invention. In FIG. 5 there is a radio network subsystem which has a serving eNB 22 or other type of radio access node, and a higher network node 24. The eNB 22 is adapted for communication over a wireless link 21A with an apparatus, such as a mobile terminal or other type of radio device referred to herein with respect to FIG. 6 as a UE 20. The eNB 22 may be implemented as any radio access node such as the described eNB or a base transceiver station (including frequency selective repeaters and remote radio heads) of another type of wireless network, such as E-UTRAN/LTE/LTE-Advanced, HSPA, WCDMA, GSM, GERAN, and the like. The higher network node 24 may be referred to in general as a controller of a radio network subsystem of which its access nodes such as the eNB 22 is a part, and in the case of LTE/LTE-Advanced networks these may be implemented as a mobility management entity MME which may also serve as the serving gateway S-GW. The higher network node 24 of their own radio network subsystems generally provides connectivity with the core cellular network and with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, and communication means such as a transmitter TX 20D and a receiver RX 20E for bidirectional wireless communications with the access node 22 using the operative radio access technology. All of the relevant wireless communications are facilitated via one or more antennas 20F. Also stored in the MEM 20B at reference number 20G are the computer code or algorithms for the UE to store its rules for flushing HARQ buffers when it determines there is a bundled TTI collision, and to offset the HARQ process numbers, as set forth in the exemplary embodiments above.

The radio access node/eNB 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 via one or more antennas 22F. In some radio technologies the cellular access node 22 will have a direct data/control link (not shown) with other adjacent cellular access nodes. Also stored in the MEM 22B at reference number 22G is the computer code or algorithms for the eNB to track the HARQ buffers that the UE flushes, including using the offset to track HARQ process numbers for bundled TTI grants, as set forth in the exemplary embodiments above.

Also at FIG. 6 is shown a controller of a radio subnetwork 24 above the example radio access node 22, which is a radio network controller RNC in the UTRA system and may be a MME and/or a S-GW as noted above for the LTE/LTE-Advanced systems. However implemented, the controller of a radio subnetwork 24 includes processing means such as at least one data processor (DP) 24A, storing means such as at least one computer-readable memory (MEM) 24B storing at least one computer program (PROG) 24C, and communication means such as a modem 24F for bidirectional communications with the access nodes under its own control.

While not particularly illustrated for the UE 20 or the access node 22, those devices are also assumed to include as part of their wireless communicating means a modem and/or a chipset and/or an antenna chip which may or may not be inbuilt onto a radio frequency (RF) front end module within those devices 20, 22 and which also operates according to the teachings set forth above.

At least one of the PROGs 20C in the UE 20 is assumed to include a set of program instructions that, when executed by the associated DP 20A, enable the device to operate in accordance with the exemplary embodiments of this invention, as detailed above and particularly summarized at FIG. 5 and thereafter. The eNB 22 also has software stored in its MEM 22B to implement certain aspects of these teachings, as summarized above. In these regards the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware) in any one or more of these devices 20, 22. In this manner the respective DP with the MEM and stored PROG may be considered a data processing system. Electronic devices implementing these aspects of the invention need not be the entire devices as depicted at FIG. 5 but may be one or more components of same such as the above described tangibly stored software, hardware, firmware and DP, or a system-on-a-chip SOC or an application specific integrated circuit ASIC or a digital signal processor DSP or a modem or an antenna module or a RF front end module as noted above.

In general, the various embodiments of the UE 20 can include but are not limited to personal portable digital assistance devices having wireless communication capabilities, including but not limited to cellular and other mobile phones (including smart phones), navigation devices, laptop/palmtop/tablet computers, digital cameras and music devices, Internet appliances, USB dongles and data cards, machine-to-machine communication or machine-type communication radio devices, radio devices mounted in vehicles, and the like.

Various embodiments of the computer-readable MEMs 20B, 22B, 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A include but are not limited to general purpose computers, special purpose computers, microprocessors, digital signal processors (DSPs) and multi-core processors.

Certain modifications and adaptations to the foregoing exemplary embodiments of this invention may become apparent to those skilled in the relevant arts in view of the foregoing description. While the exemplary embodiments have been described above in the context of UTRA systems, as noted above the exemplary embodiments of this invention are not limited for use with only these particular types of wireless radio access technology networks.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method of operating a radio device, the method comprising:
   determining whether a later received grant of bundled uplink resources received on a downlink channel collides with an active transmission process on an uplink channel corresponding to an earlier received grant of bundled uplink resources based on whether the later received grant is not aligned with a leading boundary of the bundled uplink resources granted by the earlier received grant; and
   when determining that the later received grant collides with the active transmission process, flushing at least a re-transmission buffer associated with the earlier received grant,
   wherein the bundled uplink resources granted by the earlier received grant and the bundled uplink resources granted by the later received grant comprise a first transmission time interval (TTI) bundle and a second TTI bundle, respectively.

2. The method according to claim 1, wherein the flushing comprises:
   flushing all re-transmission buffers associated with grants of uplink resources.

3. The method according to claim 1, wherein the flushing comprises:
   conditional on a first hybrid automatic repeat request (HARQ) process associated with the earlier received grant colliding with a second HARQ process associated with the later received grant, flushing the re-transmission buffer associated with the earlier received grant while not flushing a second re-transmission buffer associated with the later received grant.

4. The method according to claim 3, further comprising:
   using non-adaptive re-transmission as needed for data in the second re-transmission buffer that is not flushed.

5. The method according to claim 1, wherein determining that the later received grant collides with the active transmission process comprises:
   for each of the bundled uplink resources associated with the respective earlier received and later received grants, calculating a hybrid automatic repeat request (HARQ) process number using an offset that depends on a number of uplink subframes in a given radio frame and a size of the bundled uplink resources.

6. The method according to claim 1, wherein the method is performed by the radio device which is a user equipment operating in an evolved Universal Terrestrial Radio Access network.

7. An apparatus for operating a radio device, the apparatus comprising:
   processing circuitry configured to:
      determine whether a later received grant of bundled uplink resources received on a downlink channel collides with an active transmission process on an uplink channel corresponding to an earlier received grant of bundled uplink resources based on whether the later received grant is not aligned with a leading boundary of the bundled uplink resources granted by the earlier received grant; and
      when determining that the later received grant collides with the active transmission process, flush at least a re-transmission buffer associated with the earlier received grant,
   wherein the bundled uplink resources granted by the earlier received grant and the bundled uplink resources granted by the later received grant comprise a first transmission time interval (TTI) bundle and a second TTI bundle, respectively.

8. The apparatus according to claim 7, wherein the flushing comprises: flushing all re-transmission buffers associated with grants of uplink resources.

9. The apparatus according to claim 7, wherein the flushing comprises:
   conditional on a first hybrid automatic repeat request (HARQ) process associated with the earlier received grant colliding with a second HARQ process associated with the later received grant, flushing the re-transmission buffer associated with the earlier received grant while not flushing a second re-transmission buffer associated with the later received grant.

10. The apparatus according to claim 9, wherein the circuitry is configured to use non-adaptive re-transmission as needed for data in the second re-transmission buffer that is not flushed.

11. The apparatus according to claim 7, wherein determining that the later received grant collides with the active transmission process comprises:

for each of the bundled uplink resources associated with the respective earlier received and later received grants, calculating a hybrid automatic repeat request (HARQ) process number using an offset that depends on a number of uplink subframes in a given radio frame and a size of the bundled uplink resources.

12. The apparatus according to claim 7, wherein the apparatus comprises the radio device which is a user equipment operating in an evolved Universal Terrestrial Radio Access network.

13. A non-transitory computer readable memory tangibly storing a computer program comprising a set of computer instructions for operating a radio device, which when executed by the radio device, cause the radio device to perform a method comprising:

determining whether a later received grant of bundled uplink resources received on a downlink channel collides with an active transmission process on an uplink channel corresponding to an earlier received grant of bundled uplink resources based on whether the later received grant is not aligned with a leading boundary of the bundled uplink resources granted by the earlier received grant; and when determining that the later received grant collides with the active transmission process, flushing at least a re-transmission buffer associated with the earlier received grant, wherein the bundled uplink resources granted by the earlier received grant and the bundled uplink resources granted by the later received grant comprise a first transmission time interval (TTI) bundle and a second TTI bundle, respectively.

14. The non-transitory computer readable memory according to claim 13, wherein flushing comprises: flushing all re-transmission buffers associated with grants of uplink resources.

15. The non-transitory computer readable memory according to claim 13, wherein the flushing comprises:

conditional on a first hybrid automatic repeat request (HARQ) process associated with the earlier received grant colliding with a second HARQ process associated with the later received grant; flushing the re-transmission buffer associated with the earlier received grant while not flushing a second re-transmission buffer associated with the later received grant.

16. The non-transitory computer readable memory according to claim 15, wherein the method further includes:

using non-adaptive re-transmission as needed for data in the second re-transmission buffer that is not flushed.

17. The computer readable memory according to claim 13, wherein determining that the later received grant collides with the active transmission process comprises:

for each of the bundled uplink resources associated with the respective earlier received and later received grants, calculating a hybrid automatic repeat request (HARQ) process number using an offset that depends on a number of uplink subframes in a given radio frame and a size of the bundled uplink resources.

* * * * *